No. 739,793. PATENTED SEPT. 22, 1903.
J. SHOUREK.
COUPLING FOR AIR BRAKES.
APPLICATION FILED DEC. 22, 1902.
NO MODEL. 2 SHEETS—SHEET 1.
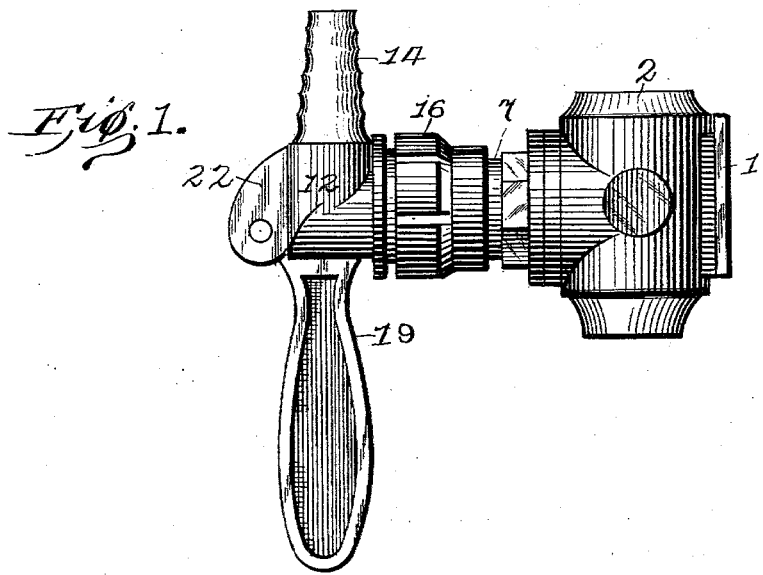
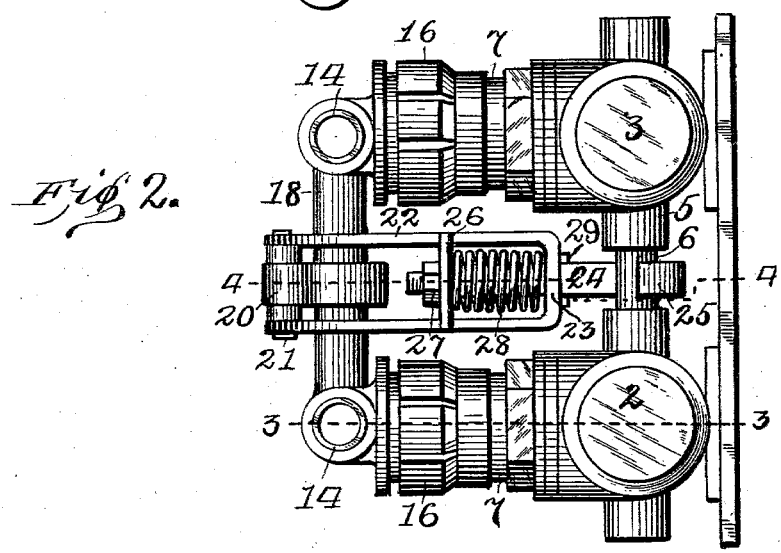
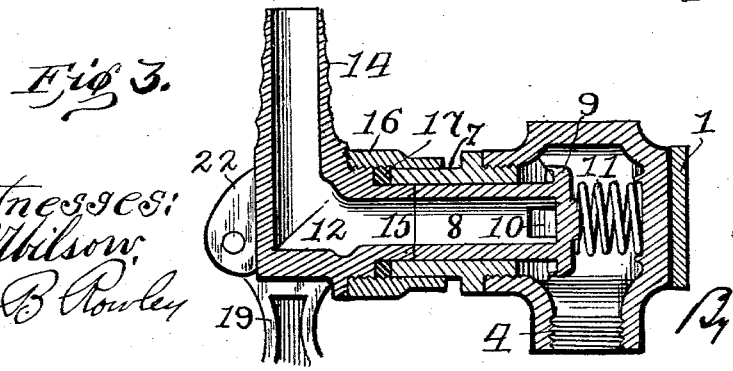
Witnesses:
Inventor
John Shourek
Attorneys No. 739,793. PATENTED SEPT. 22, 1903.
J. SHOUREK.
COUPLING FOR AIR BRAKES.
APPLICATION FILED DEC. 22, 1902.
NO MODEL. 2 SHEETS—SHEET 2.

Witnesses:
D. C. Wilson.
Geo. B. Rowley

Inventor.
John Shourek
By H. K. Ewrth
Attorneys

No. 739,793.

Patented September 22, 1903.

UNITED STATES PATENT OFFICE.

JOHN SHOUREK, OF PITTSBURG, PENNSYLVANIA.

COUPLING FOR AIR-BRAKES.

SPECIFICATION forming part of Letters Patent No. 739,793, dated September 22, 1903.

Application filed December 22, 1902. Serial No. 136,227. (No model.)

*To all whom it may concern:*

Be it known that I, JOHN SHOUREK, a citizen of the United States of America, residing at Pittsburg, in the county of Allegheny and State of Pennsylvania, have invented certain new and useful Improvements in Couplings for Air-Brakes, of which the following is a specification, reference being had therein to the accompanying drawings.

This invention relates to certain new and useful improvements in couplings, and is particularly adapted for use in connection with air-brakes such as are employed on street-cars and the like.

In the operation of air-brakes such as are used on street-cars it is necessary to have a coupling for connecting the main reservoir and the brake-cylinder with the motorman's valve, the latter being generally of such form as to be removable, so that it may be detached and moved from one end of the car to the other, as desired.

It is the object of my invention to provide a coupling of this character which may be easily and quickly connected and disconnected and which is provided with automatically-operating valve mechanism adapted upon the disconnecting of the coupling to close the ports leading to the main reservoir and brake-cylinder, this valve mechanism being automatically opened by the insertion of the coupling into the union or casing carrying the valve mechanism.

The invention is particularly adapted for use in connection with the air-brake of the type shown in Letters Patent issued to me November 14, 1899, No. 636,858, and also Letters Patent No. 661,111, dated November 6, 1900.

In describing the invention in detail reference is had to the accompanying drawings, forming a part of this specification, and wherein like numerals of reference indicate like parts throughout the several views, in which—

Figure 4:
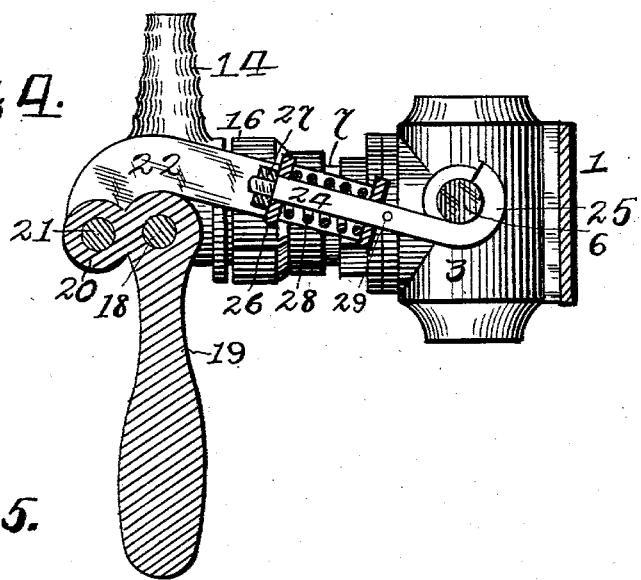
Figure 5:
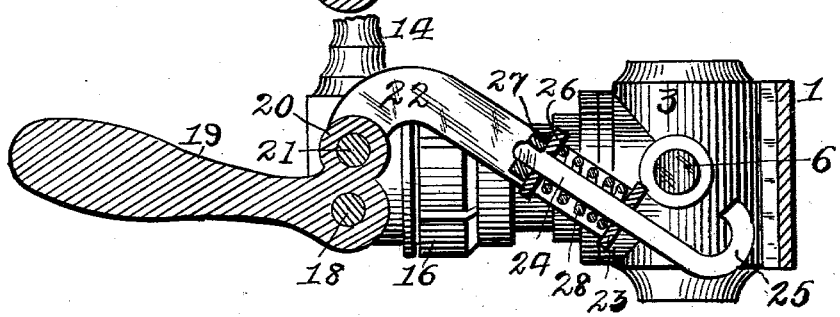
Figure 6:
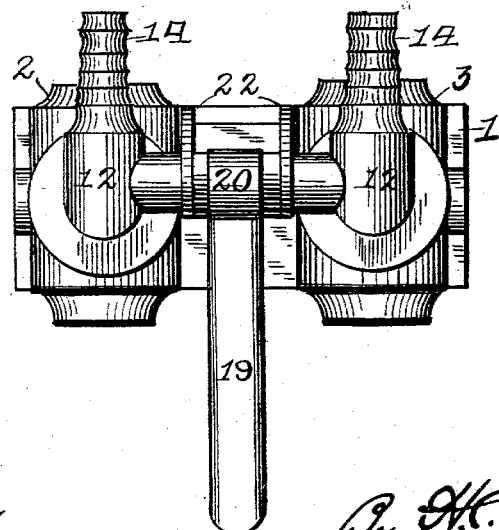

Figure 1 is a side elevation of my improved coupling and closure-valve. Fig. 2 is a top plan view of the same. Fig. 3 is a central vertical sectional view taken on the line 3 3 of Fig. 2. Fig. 4 is a central vertical sectional view taken on the line 4 4 of Fig. 2. Fig. 5 is a like view showing the hook member uncoupled. Fig. 6 is a front elevation of the coupling.

My improved coupling comprises two members, one of which is rigidly secured in the desired position on the car and the other of which is detachably connected to the rigid member. The stationary member of the coupling comprises two valve-casings, which are respectively in communication with the main reservoir and brake-cylinder. The valve mechanism is arranged in each of these valve-casings for closing the outlet-ports therefore when the detachable member is removed, and means is provided on the detachable member for engagement with the valve mechanism when inserted into the valve-casings for unseating the valves to open the port through the coupling to the motorman's valve. Means is carried by the detachable member for engagement with the stationary member to hold the two members locked when in engagement.

To put my invention into practice, I provide a securing-plate 1, which is adapted to be rigidly fastened to the car (not shown) at the desired point. Securely fastened to this plate 1 is a pair of valve-casings 2 3, identical in construction, and are provided in their underneath face with a coupling 4, to which the pipes leading to the brake-cylinder and main reservoir are respectively connected. The valve-casings 2 and 3 may be cast integral, and the connecting-rod 5 between the casings is reduced centrally of its length to form the shaft 6, with which the hook member of the detachable portion of the coupling is adapted to engage, as will later be described. Each valve-casing is provided with an opening on its front face, the interior walls of which are threaded, and threaded into this opening are sleeves 7, in which is fitted the hollow valve-stem 8, carrying the valve 9, adapted to seat against the one end of the sleeve 7. These valves 9 are held in engagement with the seat when the detachable member of the coupling is disconnected by springs 11, and when the valve is unseated by the insertion of the detachable member of the coupling air is admitted from the valve-casings through ports 10, provided therefor in the hollow valve-stem 8.

The detachable member of the coupling comprises a pair of elbows 12, one end of which is formed into nipples 14 to receive the hose (not shown) leading to the motorman's valve and the other portions 15 of which are adapted to engage in the outer end of the sleeve 7, abutting against the outer ends of the hollow valve-stems 8, so as to unseat the valves 9, as seen in Fig. 3. The collar 16 is threaded onto the short arms of the elbows, and a gasket or washer 17 is placed on said short arms 15 upon the annular shoulder formed on the arms and is engaged by the outer ends of the sleeves 7. The elbows 12 are connected together by the shaft or rod 18, on which is centrally mounted the operating handle or lever 19, this operating handle or lever being formed with the integral link 20, connected by the pin or shaft 21 with the outer downwardly-curved ends of the yoke 22. This yoke is connected by the cross-bar 23 at its inner end, and extending through this cross-bar is a shank 24 of the hook 25, the latter adapted to be engaged with the shaft 6, connecting the two valve-casings together. The shank 24 is extended through the cross-head 26, carried by the yoke and slidable thereon, said shank being secured by the nut 7. Arranged between the slidable cross-head 26 and the cross-bar 23 of the yoke is a stiff coil-spring 28.

In operation, assuming that the detachable member has been disconnected from the stationary or rigid member and it is desired to connect the same, the yoke 22, carrying the hook 25, is engaged with the shaft 6, the short arms 15 of the elbows being placed against the outer end of the hollow valve-stems 8, in which position they are held by the collars 16, sliding over the sleeves 7. The lever 19, which will then be in the position shown in Fig. 5 of the drawings, is forced downwardly to the vertical position, drawing the yoke 22 forwardly, compressing the spring 28 and firmly engaging the hook 25 with the shaft 6. To disengage the removable member, the operating handle or lever 19 is pulled upwardly, which will move the yoke 22 rearwardly and allow the hook member 25 to be disengaged from the shaft 6, at which time the elbow members can be readily removed from sleeves 7. The hook member is limited in its forward movement when disengaged from the shaft 6 by the pin 29, inserted through the shank 24 and which engages with the rear face of the cross-bar 23.

It will be observed that all that is required in order to apply the coupling is to place the hook 25 over the shaft 6, the collar 16 at the same time being inserted over the sleeve 7 and the handle or lever then forced downwardly. This downward pressure on the handle forces the elbow members inwardly, automatically unseating the valves 9, so as to open communication to the brake-cylinder and main reservoir, and when the handle is pulled upwardly to uncouple the springs 10 behind the valves automatically seat the valves, so as to close the ports.

Having fully described my invention, what I claim as new, and desire to secure by Letters Patent, is—

1. In a coupling of the class described, a pair of valve-casings, a connecting member between the casings, a spring-held valve in each of said casings, a detachable member comprising a pair of elbows adapted when in position to engage and unseat the spring-held valves, a connecting member between said elbows, an operating lever or handle mounted on said connecting member, a yoke connected to said handle or lever, and a spring-held hook carried by the yoke for engagement with the connecting member between the two valve-casings, substantially as described.

2. In a coupling of the class described, the combination with a stationary member comprising a pair of valve-casings connected together, and spring-held valves in said casings, of a detachable member comprising a pair of elbows connected together and adapted to engage the valve-casings, and means carried by the detachable member for engagement with the stationary member to lock the two parts together, substantially as described.

3. In a coupling of the class described, a stationary member embodying a valve-casing, a spring-held valve therein, a sleeve carried by the valve-casing, an elbow member, a collar carried thereby to engage the sleeve, and means for locking the elbow member and valve-casing together, substantially as described.

4. In a coupling of the class described, the combination with a supporting-plate, a pair of valve-casings carried thereby, a sleeve secured in each of said casings, a hollow valve-stem mounted in each of said sleeves and provided with ports, valves carried by said hollow stems, means for holding said valves in seating engagement with the inner ends of said sleeves, a pair of elbow members connected together, collars carried by said elbow members to engage on the sleeves carried by the valve-casings, an operating handle or lever mounted on a connecting member between the two elbow members, and means connected to said operating lever or handle for securing the elbow members and valve-casings in locked engagement, substantially as described.

5. In a coupling of the class described, a pair of valve-casings rigidly secured side by side, a connecting member between the valve-casings, a pair of coupling-elbows to engage in the valve-casings, valves mounted in the valve-casings and held normally unseated by the engagement therewith of the elbow-couplings, a connection between the couplings, and means mounted on said connection and engaging the connecting member between the valve-casings to retain the couplings in locked engagement with the valve-casings, substantially as described.

6. In a coupling of the class described, the combination with stationary valve-casings, and spring-held valves mounted therein, of detachable coupling-elbows engaging in the valve-casings and holding the valves normally unseated, and pivoted means for securing the coupling-elbows and valve-casings in locked engagement, substantially as described.

In testimony whereof I affix my signature in the presence of two witnesses.

JOHN SHOUREK.

Witnesses:
H. C. EVERT,
A. M. WILSON.